(12) United States Patent
Venables et al.

(10) Patent No.: US 7,969,884 B1
(45) Date of Patent: Jun. 28, 2011

(54) METHOD AND SYSTEM FOR WEIGHT AND RATE SCHEDULING

(75) Inventors: Bradley D. Venables, Ottawa (CA); David G. Stuart, Almonte (CA)

(73) Assignee: Nortel Networks Limited, Mississauga, Ontario (CA)

( * ) Notice: Subject to any disclaimer, the term of this patent is extended or adjusted under 35 U.S.C. 154(b) by 92 days.

(21) Appl. No.: 12/118,410

(22) Filed: May 9, 2008

(51) Int. Cl.
*G08C 15/00* (2006.01)
(52) U.S. Cl. ........................................ 370/235
(58) Field of Classification Search .................. None
See application file for complete search history.

(56) References Cited

U.S. PATENT DOCUMENTS

| | | | | |
|---|---|---|---|---|
| 7,385,987 | B1* | 6/2008 | Charny et al. | 370/395.4 |
| 7,567,572 | B1* | 7/2009 | Charny et al. | 370/395.4 |
| 7,830,889 | B1* | 11/2010 | Lemaire et al. | 370/395.4 |

* cited by examiner

*Primary Examiner* — Kevin C Harper
(74) *Attorney, Agent, or Firm* — Christopher & Weisberg, P.A.

(57) ABSTRACT

A method and system for scheduling data dequeuing in a data communication network having a plurality of data queues and a hierarchical scheduler with a plurality of scheduling nodes. A determination is made as to which scheduler nodes and which data queues are eligible for dequeuing scheduling based upon at least one predetermined data rate limitation and availability of data at an eligible descendant node. Data is scheduled for transmission from one of the plurality of data queues. Scheduling data for transmission includes selecting one or more child scheduler nodes which are descendents of the one data queue but to whom the eligible child is not known to be eligible.

20 Claims, 9 Drawing Sheets

METHOD AND SYSTEM FOR WEIGHT AND RATE SCHEDULING

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to a method and system for scheduling transmission of data packets in a communication network and more specifically to a method and system for scheduling data packet transmission using a contemporaneous combination of rate scheduling and hierarchical weight-based scheduling.

BACKGROUND OF THE INVENTION

Every computer and communication network which transfers data packets must implement some form of scheduling to insure that data traffic progresses through the network with a defined quality. At any given moment, a network may have hundreds of thousands or even millions of connections containing data queues waiting for transport through the network. Some form of scheduling is required to enable network elements to process these data queues in a fair and efficient manner.

A simple form of scheduling is a "First In-First Out" ("FIFO") approach where the first packets received by a network device are the first packets distributed to a destination. A second scheduling method is known as a "round-robin" approach where each incoming data queue is assigned an equal dequeuing time slice and each queue is processed in turn by pulling data from the queue according to its assigned time. However, FIFO and round-robin scheduling do not allow for prioritization of data queues.

Generally, service providers sell network access to subscribers according to a guaranteed data service rate. Some service plans guarantee faster data delivery rates than others. Subscribers often pay a premium for higher guaranteed rates, while lower fees may apply to slower guaranteed rates. Additionally, service providers may selectively section off a portion of their available resources as dedicated to certain types of data that require more bandwidth and/or immediate delivery, e.g., streamed video, voice-over-IP ("VoIP"), etc. Service providers are able to implement structured pricing plans and guaranteed delivery of various data types by implementing priority values to incoming data. More advanced scheduling techniques take into consideration the assigned priority values when determining which data to dequeue, i.e., transmit.

For example, one form of scheduling is known as rate-based scheduling or shaping. Rate-based scheduling aims for specific data queues to be serviced, i.e., processed, according to a given data rate. The target data rate can be offered as a range of service rates having a minimum guaranteed rate, a maximum rate limit, and one or more burst quanta. A minimum guaranteed rate often refers to a contracted minimum bandwidth which must always be available, even when the network is very busy. A maximum rate often refers to a bandwidth limit that will be allowed to transmit (for more than a defined burst) and typically applies when the network is not busy. A distinct characteristic of rate scheduling is this behavior of limiting the transmitted bandwidth when the network could accept additional bandwidth. A scheduler assigns each connection to an incoming data queue with a specific service description. The scheduler then services the queues while respecting the service rates, without considering the overall queuing load.

Another form of scheduling is generally known as weighted fair queuing ("WFQ"). WFQ is a derivative of Fair Queuing wherein each data queue is serviced with a different share of the total bandwidth according to an assigned weight. WFQ in this context does not refer to a specific algorithm; it could refer to any algorithm which provides proportional fairness between queues.

Yet another form of scheduling is priority queuing ("PQ"). Priority queuing is a technique where a scheduler gives certain data queues preferential service over other data queues. Sometimes priority queuing schemes also incorporate service limits or service guarantees to avoid a situation where lower priority queues get no service for sustained periods.

Figure 1:
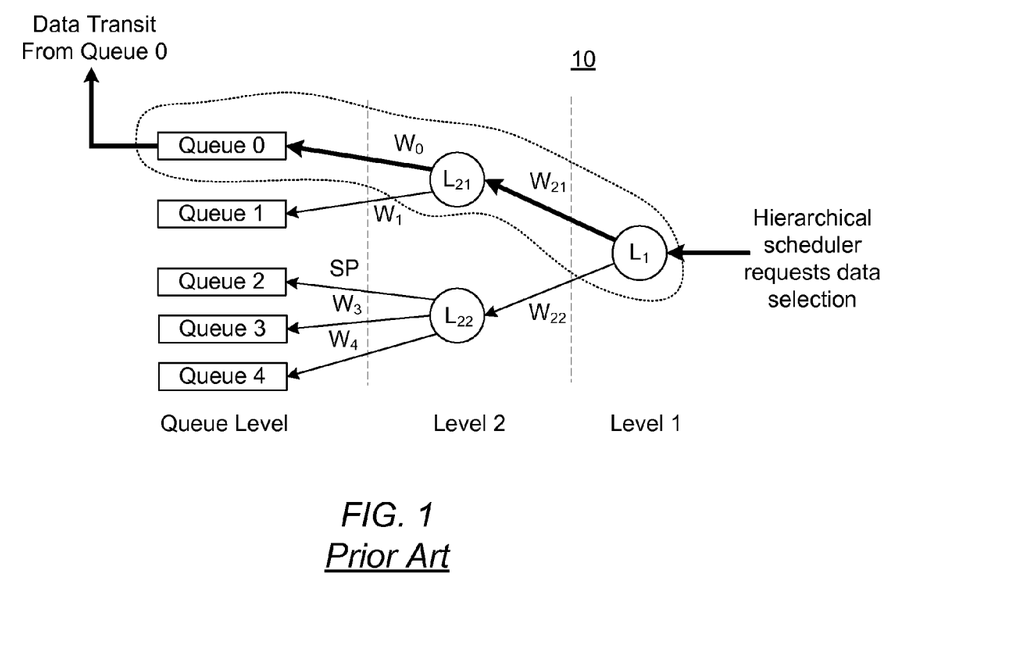
FIGS. 1 and 2 are block diagrams of a hierarchical scheduling tree structures constructed in accordance with prior art.

A scheduling system may be represented according to a hierarchical tree structure 10, such as the one depicted in FIG. 1, wherein a root node ($L_1$) typically represents the entire bandwidth of the network or data pipe. The root node is subdivided to child nodes $L_{21}$ and $L_{22}$ in which a child is allotted a portion of the total bandwidth according to its assigned weight $W_{21}$ and $W_{22}$. Each child node may be further subdivided into "grandchild" nodes, such as $Q_0$ and $Q_1$ for child $L_{21}$, wherein the total share of the child node's bandwidth is divided among the grandchildren, and so on. The lowest nodes in this tree structure are sometimes referred to as "leaves" and generally represent data queues. Non-leaf nodes generally represent schedulers.

A scheduling system consisting of a hierarchical tree structure where each level runs a scheduling algorithm which attempts to partition bandwidth according to weights and priorities can generally be called a Hierarchical Weight-Based Scheduler ("HWS"). In one implementation of a HWS, a tree node may locally implement a mix of PQ and WFQ algorithms, such as scheduler $L_{22}$ which is scheduling queue $Q_2$ with high priority and partitioning the remaining bandwidth between queues $Q_3$ and $Q_4$ based on weight.

Figure 2:
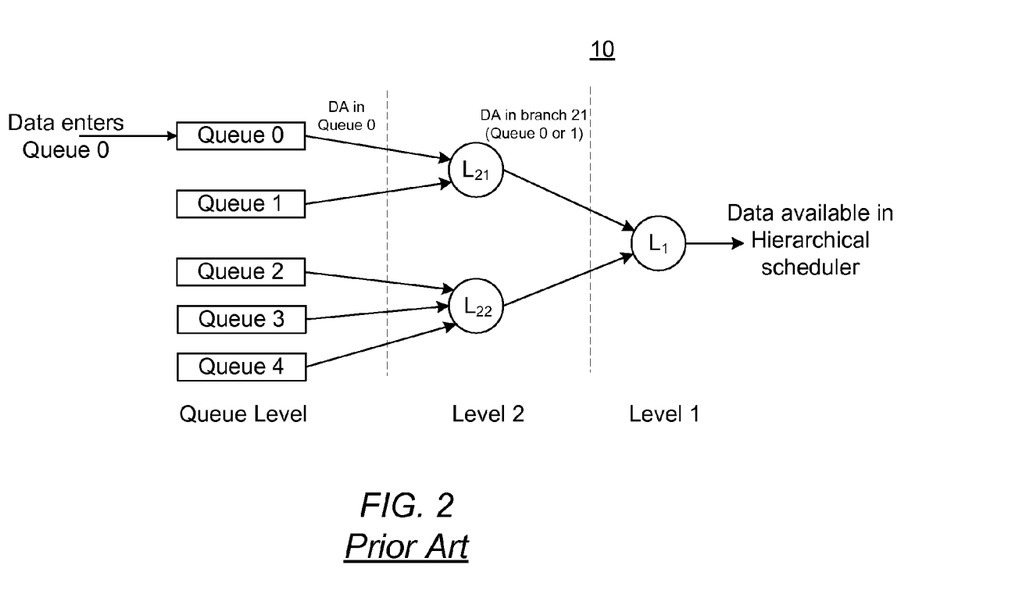

FIG. 2 shows another aspect important to HWS, which is the determination at all levels of the hierarchy of which children have data available ("DA") to transmit. This aspect is called data available propagation. DA propagates from the leaves, i.e., queues, towards the root to announce changes of state from child to parent nodes. A first node propagates its data availability state to its parent when the first node is DA. The propagation puts the parent into the DA state, which may require further propagation to the grandparent if the parent was not previously DA. From the perspective of the parent, the parent non-leaf node is DA if at least one of its child nodes is DA. The overall effect of DA propagation is a node is DA if any of its descendant queues have data packets ready for delivery.

For example, node $L_1$ is DA if node $L_{21}$ is DA, or node $L_{22}$ is DA. Node $L_{21}$ is DA if either $Q_0$ or $Q_1$ is DA. At any time, if a node is not DA, its share of the bandwidth is divided amongst the remaining DA nodes according to their priorities and weights. Where a node has children with PQ configured, such as $Q_2$ for node $L_{22}$ which is a high priority queue, i.e., strict priority or equivalent to infinite weight), a proportional distribution of bandwidth based on weight fairness generally occurs after satisfying the priority children.

An HWS system, as defined here, provides a fair distribution of bandwidth based on priorities and weight values;

however, network service providers often sell their services based on rate not proportional weight, e.g., subscriber rate may equal 1 Mb/sec. Under some network loads, rate based scheduling is more intuitive and/or required, e.g., lightly or heavily loaded networks, but under other network loads, weight-based scheduling with hierarchy is fairest. Some service providers have developed the ability to switch between a rate-based scheduler and an HWS scheduler depending upon network load or time of day. However, it is difficult to implement a combination of the two methods that work simultaneously.

Therefore, what is needed is a method and system for scheduling data packet transmission using a contemporaneous combination of rate scheduling and hierarchical weight-based scheduling.

SUMMARY OF THE INVENTION

The present invention advantageously provides a method and system for scheduling data dequeuing in a data communication network. Generally, the present invention advantageously provides rate-based scheduling for contemporaneous use with hierarchical weight and priority based scheduling to provide an improved method of processing data queues.

One aspect of the present invention provides a method for scheduling data dequeuing in a data communication network having a plurality of data queues and a hierarchical scheduler with a plurality of scheduling nodes. A determination is made as to which scheduler nodes and which data queues are eligible for dequeuing scheduling based upon at least one predetermined data rate limitation and availability of data at an eligible descendant node. Data is scheduled for transmission from one of the plurality of data queues. Scheduling data for transmission includes selecting one or more child scheduler nodes which are ancestors of the one data queue but to whom the eligible child is not necessarily known to be eligible.

In accordance with another aspect, the present invention provides a system for scheduling data in a data communication network. A hierarchical scheduling plane having a plurality of scheduling nodes is arranged in a tree structure. The hierarchical scheduling plane selects data for transmission from one of a plurality of data queues. A rate generator/monitor associates a state to at least one of the scheduling nodes and queues in the scheduler tree structure. A message storage structure is in communication with the rate generator/monitor and a scheduler node for at least one parent node. The message storage structure stores messages requesting that a child scheduler node state become active in the scheduler.

In accordance with still another aspect, the present invention provides a scheduler for scheduling data dequeuing in a data communication network. The scheduler has an eligibility plane and a scheduling plane communicatively coupled to the eligibility plane. The eligibility plane determines that a data queue of a plurality of data queues is eligible for dequeuing scheduling based upon at least one predetermined data rate limitation and presence of data in the data queue. The scheduling plane schedules the eligible data queue for dequeuing according to hierarchical scheduling, in which the scheduling plane is arranged as a tree structure. The scheduling plane has at least one scheduling node determining a relative fairness between children. Each data queue of the plurality of data queues stems from at least one of the scheduling nodes.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Before describing in detail exemplary embodiments that are in accordance with the present invention, it should be observed that the embodiments reside primarily in combinations of apparatus components and processing steps related to implementing a system and method for scheduling data packet transmission using a contemporaneous combination of rate scheduling and hierarchical weighted fair queuing. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements. A "root" node refers to the highest level node in a weighted fair queuing tree, or the highest node in a branch of a hierarchical weighted fair queuing tree. A "descendant" of a particular node is any node at a level below the node in question whose lineage may be traced back to the node in question. The terms "child," "child node" or "children" refer to any direct descendants of a node in a scheduling tree. Generally, when discussing a relationship to a particular node, the term "child" refers to a node one level below the node in question and the term "grandchild" refers to a node at least two levels below the node in question. Additionally, any node descending from a node having a higher level may be referred to as a "child node" or "child."

In the description of the current invention, "maximum rate" refers to a rate limit above which the bandwidth is non-conforming. To one versed in the art, this maximum rate is known by many different names depending upon the protocol employed, including but not limited to peak rate, excess bandwidth, and sustained bandwidth.

One embodiment of the present invention advantageously provides a method and system for scheduling data packet transmission in a data communication system by merging rate-based scheduling and hierarchical weight-based scheduling into a single system. Previously, premium implementations of these two scheduling concepts simultaneously asserting requirements on the same resource, e.g., queue, node, bandwidth partition, were considered to be orthogonal, i.e., mutually independent. An embodiment of the present invention combines the concepts of data availability propagation and child absorption, from hierarchical scheduling implementations, with the concept of descendant eligibility from rate-based implementations.

Figure 3:
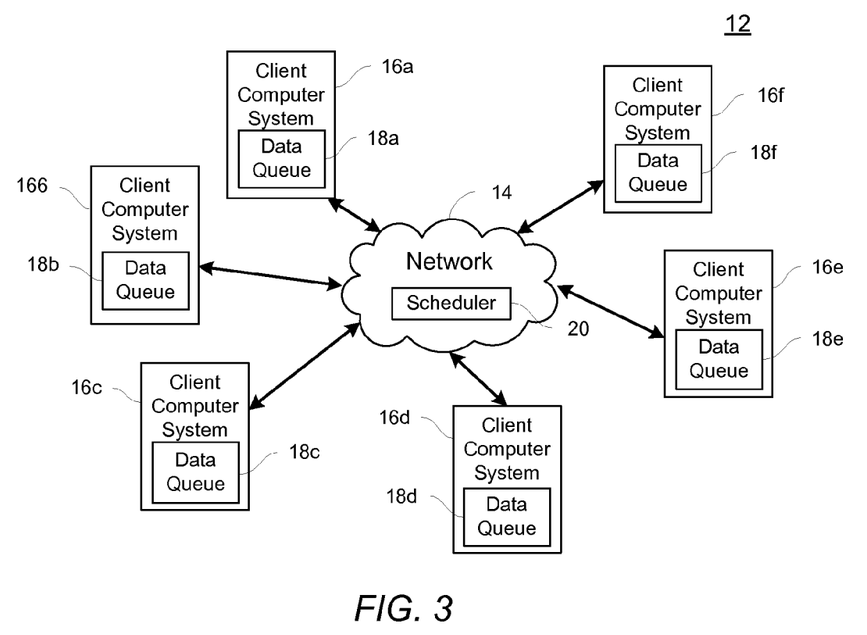
FIG. 3 is a block diagram of an exemplary data communication system constructed in accordance with the principles of the present invention.

The present invention provides the framework for a premium scheduling system which is configurable and manageable for a broad range of applications by dividing the scheduler function into two sections: an eligibility plane and a scheduling plane. The eligibility plane includes a component of rate generation and measurement which determines whether child nodes are eligible for additional bandwidth, according to rate scheduling disciplines, based on the rates of the child and its descendants. The eligibility plane combines node eligibility based on measured and configured rates with node eligibility based on data availability ("DA") in the queuing system into a simple eligibility state per node in the system. The scheduling plane implements hierarchical weight-based and priority-based scheduling, which can have low computational complexity. For example, an exemplary implementation of the scheduling plane uses control lists to sort and alternate between children in a manner similar to round robin or strict priority control queues. The computational complexity to select a child for processing next with respect to number of children in the scheduler can be O(1) using generally accepted "big O notation" from computational complexity theory Referring now to the drawing figures in which like reference designators refer to like elements, there is shown in FIG. 3, a data communication system constructed in accordance with the principles of the present invention and designated generally as "12." System 12 includes a wide-area network 14 such as the Internet, intranet, or other communication network, including but not limited to a personal area networks ("PAN"), local area networks ("LAN"), campus area networks ("CAN"), metropolitan area networks ("MAN"), etc. The wide-area network 14 may be connected to a plurality of client computer systems (six shown) 16a, 16b, 16c, 16d, 16e, 16f referred to collectively as computer system 16. Each computer system 16 may include a single client computer, multiple client computers connected together to form a smaller network, or multiple smaller network systems. Each client computer system 16 provides a data packet queue (six shown) 18a, 18b, 18c, 18d, 18e, 18f referenced collectively as 18. A scheduler 20 constructed in accordance with the principles of the present invention determines when and how many data packets from each data queue 18 are routed through the network 14. The scheduler 20 may be implemented as a portion of a router, switch, gateway, hub, or other interface device, or may be implemented as a stand-alone device or as part of a computer monitoring system. Additionally, each client computer system 16 may include its own scheduler(s) for determining when and what data enters its own data queue 18. In other words, the scheduler 20 of the present invention can be implemented as a logical process in any network element that has data queues to process. As such, the arrangement in FIG. 3 is merely exemplary and is included solely to aid understanding of the invention.

Figure 4:
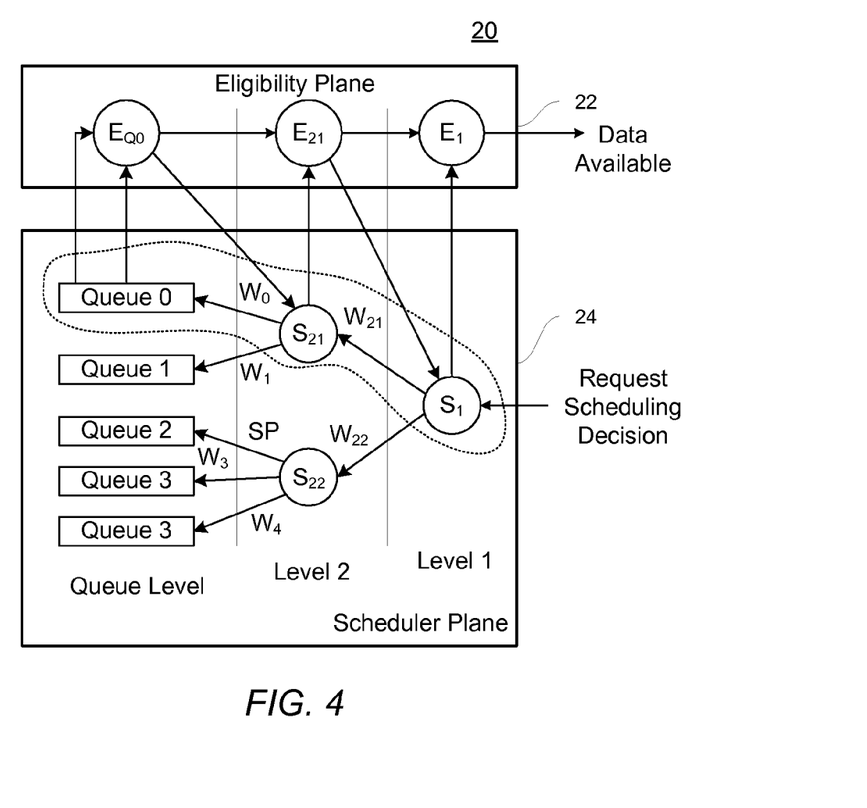
FIGS. 4-7 are block diagrams of an exemplary weight and rate scheduler constructed in accordance with the principles of the present invention.

Referring now to FIG. 4, an exemplary weight and rate scheduler 20 constructed in accordance with the principles of the present invention may include an eligibility plane 22 and a scheduling plane 24. The scheduling plane 24 contains the scheduling hierarchy and scheduling algorithms used to ultimately select a data queue which should transmit data. This scheduling plane 24 has similar attributes to the generic scheduler 10 shown in FIG. 1, other than the details of interaction with the eligibility plane 22. In an exemplary implementation, the scheduling plane 24 uses algorithms which are designed to partition bandwidth between children based on a combination of priority and relative fairness between active children. Here, the term "active" refers to children which the scheduler 24 is aware have data which could be selected, so the scheduler algorithm is seeking to provide the child with its fair configured service. The specific scheduling algorithms employed are not limited within the current invention. The scheduler plane 24 may include weights (relative importance), classes (a service description), and/or priorities for all data queues and scheduling nodes in the scheduler plane 24. These weights, classes and priorities are used by the scheduling nodes to choose from active children. The scheduler plane 24 also has knowledge of the hierarchical connections ancestor/descendant information for each node. The hierarchical connections could be configured, programmed, coded or implied by stored state, but in the process of making a scheduling decision, the scheduler 24 is capable of traversing the hierarchy.

In a typical scheduler plane 24 implementation, the control structures associated with a scheduling node contain all children which are eligible to transmit. For example, the control list of a round robin scheduler has one instance of each child identified in the list. This eligibility to transmit condition is managed in the current invention by the eligibility plane 22.

The eligibility plane 22 is an overlay system which generates and monitors rates and data availability for all data queues and scheduler nodes in the scheduler 20. The eligibility plane 22 includes the generic data availability determination introduced in FIG. 2. The eligibility plane 22 also requires knowledge of the scheduling hierarchy since propagation of data available requires knowing which parent scheduler or parent eligibility node needs to be alerted of the newly eligible child. This child to parent mapper may be shared between the eligibility plane 22 and the scheduler plane 24, depending upon the implementation. For ease of implementation, the eligibility plane 22 may be partitioned into the same hierarchical levels as the scheduler plane 24, as shown in FIG. 4. However, other embodiments of the invention could have eligibility planes 22 which have different physical hierarchy than the scheduler hierarchy, different logical hierarchy than the scheduler hierarchy, or allow for more than one parent of a child. In these cases, the hierarchy in the eligibility plane 22 and the scheduler plane 24 are obviously separate. For clarity in the discussion here, both the eligibility plane 22 and the scheduler plane 24 have the same hierarchy, and each node within the eligibility plane has knowledge of who is its parent in the hierarchy.

The eligibility plane 22 determines for each scheduling node in the scheduling plane 24 whether data is queued at any descendant queue for which all intermediate scheduling nodes are eligible for scheduling. The eligibility plane 22 calculates, stores, compares, and propagates information used to determine whether a child is eligible. The process of merging eligibility at each level of the hierarchy is similar to the background discussion associated with FIG. 2; however, the current invention defines much more complex eligibility criteria. At a high level, the current invention's eligibility criteria include data available, monitored rates and priority elevation.

Figure 5:
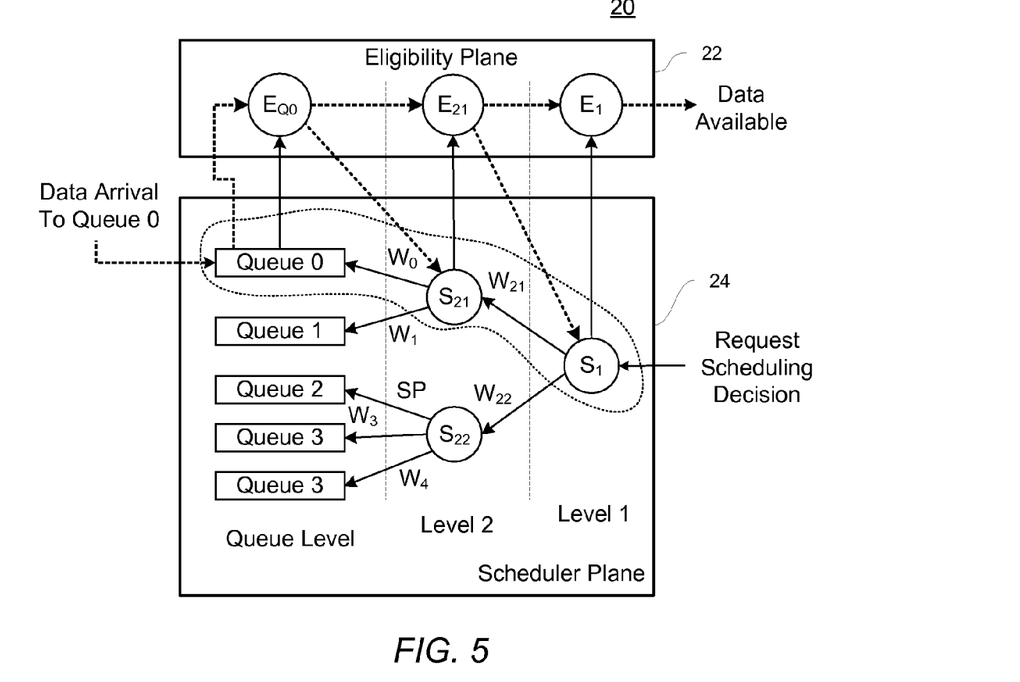

FIG. 5 depicts the specific case of an empty queue receiving data that is the first data to arrive to a whole branch of the scheduling hierarchy. An example process for the eligibility plane follows. The process starts at the left of the figure where data arrives to the data queue. $E_{Q0}$, the eligibility node associated with the queue, detects or is alerted that a previously empty data queue $Q_0$ received data which requires scheduling. The eligibility node $E_{Q0}$ first decides if the queue $Q_0$ should be eligible, including any configured rate limits, then notifies the scheduler node $S_{21}$ of the newly eligible queue. At the same time, the eligibility node $E_{Q0}$ informs the parent eligibility node $E_{21}$ that the scheduler $S_{21}$ now has data available. Within the scheduling plane 24 there may be some delay in absorbing child $Q_0$ into the scheduler node $S_{21}$ context, but the current invention allows the propagation of the data available up through the eligibility plane 22 without waiting for absorption to complete. Eligibility node $E_{21}$ determines that $S_{21}$ has transitioned from not eligible to eligible (again including an examination of any configured rate limits) and informs the parent scheduler node $S_1$ that $S_{21}$ is eligible for scheduling. As at previous levels, the eligibility plane 22 propagates the data available from $E_{21}$ to $E_1$.

After considering any rate limits configured for the total bandwidth of the scheduling branch shown in FIG. 5, the eligibility plane 22 updates the overall eligibility for the scheduling plane 24. With the scheduling plane 24 activated (eligible), an external event can now trigger the scheduler 24 to select a queue for transmission. When the scheduling plane 24 selects the parent $S_1$ for scheduling, it may pull data all the way up from data queue $Q_0$ as shown by the dashed circled area of FIG. 6. The process of transmitting data from a selected queue, as shown in FIG. 6 is discussed in more detail below.

In an exemplary implementation the eligibility propagation need not be instantaneous, but it is important that the eligibility plane 22 provides to the scheduling plane 24 changes of eligibility state at lower levels of the hierarchy before those at the higher levels. The current invention does not require the eligibility state absorption to happen at lower levels of the scheduling plane 24 before higher levels, but the state must be made available in the correct order. If at any level of the hierarchy, the child is already active in the parent scheduler node's context, the propagation of data available does not proceed any higher.

Figure 7:
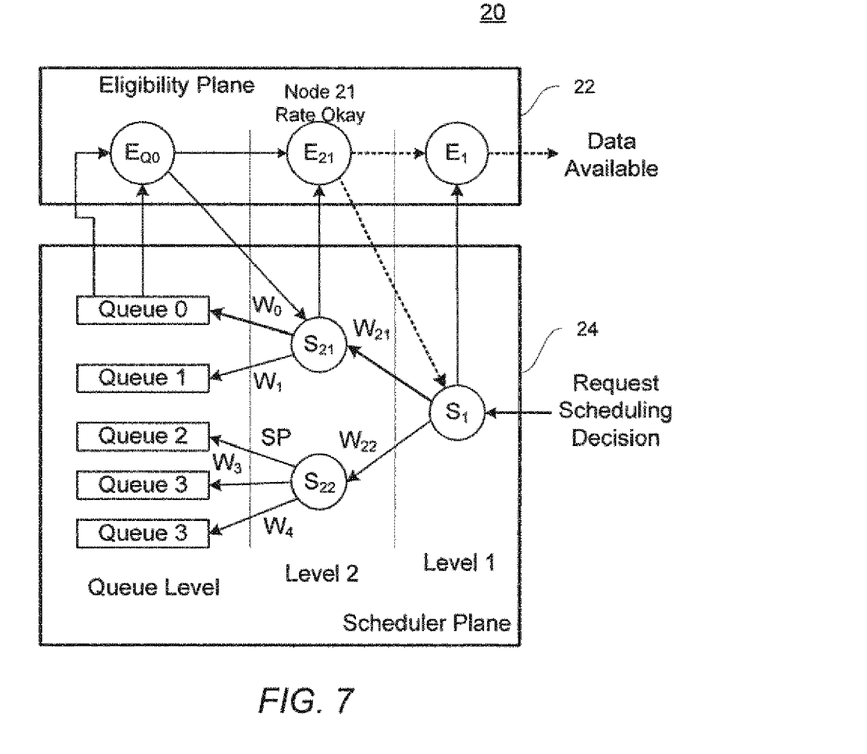

A similar process to data enqueue also occurs for other changes of eligibility state such as when the eligibility plane 22 detects a queue or scheduling node transitioning from maximum rate exceeded to back in range. FIG. 7 depicts the process of removing a rate limit which was previously applied at node $S_{21}$. The process starts with the rate generation/monitoring function within $E_{21}$ identifying the new eligibility due to rate monitoring. The remainder of the process is the same as if an enqueue triggered the process.

Figure 6:
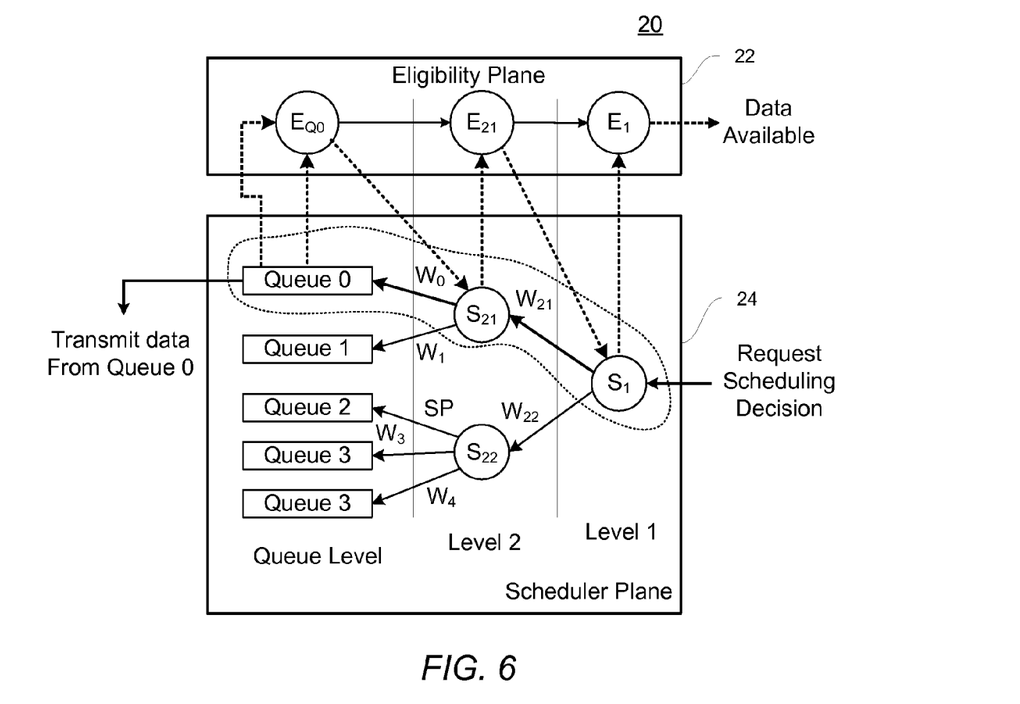

FIG. 6 shows a transmit operation from the same system of the previous examples. During this transmit operation the interactions between the eligibility plane 22 and the scheduling plane 24 are different from the enqueue operations. During data transmission, there is a risk that one of the eligibility nodes could assert a maximum limit against the current flow. Also, the mapping of child to parent is not required as the scheduling hierarchy is already aware of that information. The determination of whether more data is available should be made quickly, so that the next scheduling decision can start with correct information. In FIG. 6, the scheduling plane 24 chooses the queue by traversing each scheduler node from the top of the hierarchy to the bottom, choosing from among eligible children at each level. For example, the decision could proceed from $S_1$ to $S_{21}$ to Queue 0 within the scheduling plane 24. Queue 0 then provides its new fill state (data available) and amount of data transmitted to $E_{Q0}$. $E_{Q0}$ calculates an up-to-date queue transmit rate and calculates whether maximum bandwidth limits have been exceeded. $E_{Q0}$ then informs $S_{21}$ whether the queue is still eligible. Even if $E_{Q0}$ determines that queue 0 is no longer eligible, scheduler node $S_{21}$ may be aware of a different eligible child which would still make data available from $S_{21}$. Therefore, $S_{21}$ is responsible for determining its new data available state and informing $E_{21}$. $E_{21}$ calculates the current transmit rate at node 21 and forwards the eligibility state to $S_1$. Again, $S_1$ determines if any child is eligible for scheduling at node 1 and forwards the new data available state to $E_1$. $E_1$ calculates the up-to-date rate for node 1 and advertises the overall eligibility state for the scheduling system.

The current invention maximally isolates the overall scheduling system into three separate regions of performance: the hierarchical scheduling plane, the rate monitoring maintenance process, and the eligibility state maintenance. The rate monitoring and eligibility state maintenance have been combined into the eligibility plane 22. The scheduling plane 24 is optimized for making complex decisions at a regular pace, representing the scheduling rate required to meet the bandwidth objectives of the transmission. As part of the scheduler transmit operation, the eligibility plane 22 assists in an immediate state refresh. However, in an exemplary implementation of the eligibility plane 22, this plane 22 is primarily optimized for rapid parallel refreshes of child eligibility state to allow for very accurate rate information and propagation. Typical implementations of the scheduler plane 24 cannot quickly absorb bursts of state changes, so newly eligible child ("NEC") and priority elevation child ("PEC") structures are provided to act as a gasket between the eligibility plane bursts and the steady cantor of the scheduling plane 24. An exemplary implementation of the eligibility plane 22 is capable of quickly absorbing bursts of eligibility state changes as the data being propagated and stored is very simple, such as a data available flag per data queue or scheduling node in the scheduling plane 24. A significant element of the eligibility plane 22 in the current invention is the rate monitor which is designed to update rate calculations at a pace which simultaneously meets scalability objectives and time granularity aspects of the rate scheduling service. In an exemplary implementation, rate monitors are capable of changing the state of many children, at many levels of the hierarchy in a short period of time. Where the change of state is a transition from maximum rate limited to within range, these rate monitors can generate bursts of actions similar to data enqueues (DA) in the traditional system of FIG. 2. In implementations where fine level control over quality of monitored rates is required, the rate monitor may even involve dedicated schedulers or other algorithms. But, in an exemplary implementation, the state which the rate monitor generates consists of flags indicating in-profile or out-of-profile. The eligibility plane 22 of the current invention supports all eligibility features at each level of the hierarchy, but other solutions are possible with a subset of eligibility features, tailored at each node to the network application. If any level of the eligibility plane 22 produce bursts of eligibility events (beyond what can be easily absorbed into the scheduler context) then ancestor levels of the eligibility plane 22 will also experience bursts of eligibility events. Therefore, the current invention applies to systems when some of the levels have much simpler and/or less bursty eligibility criteria, such as would be the case if some levels have no rate limits.

Figure 8:
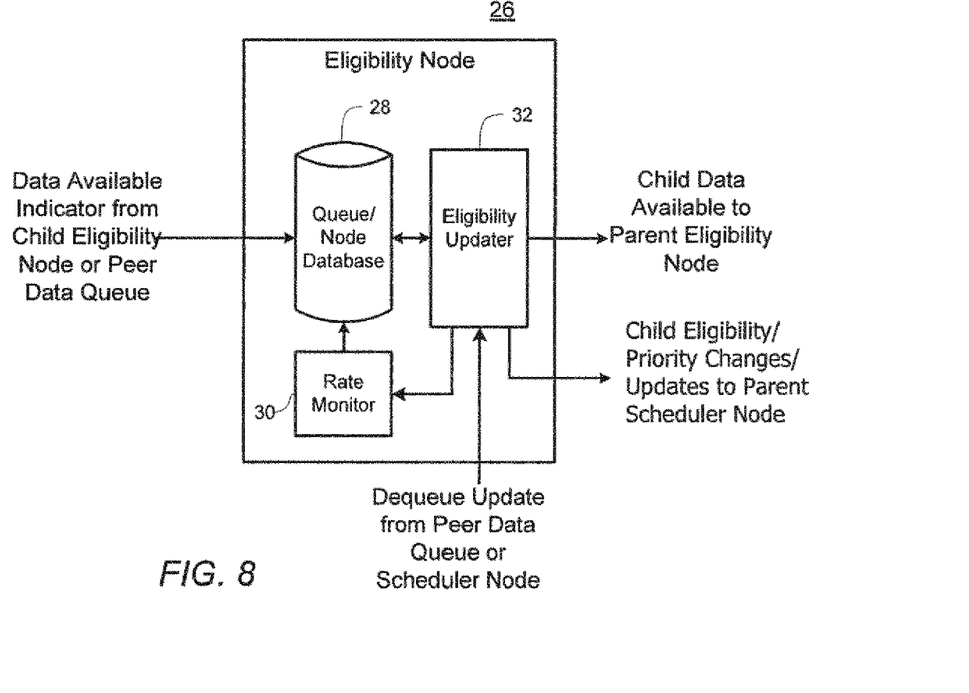
FIG. 8 is a block diagram of an exemplary eligibility node constructed in accordance with the principles of the present invention.

In one embodiment, the scheduling plane 24, with its scheduling nodes running relative fairness and priority algorithms, is the dominant plane when it comes to choosing data. Scheduling plane dominance is the natural way to think of the scheduler 20 because the trigger to start the queue selection process occurs in the scheduling plane 24 and a transmit queue is ultimately chosen by the scheduling plane 24. However, the scheduler 20 optionally allows for the eligibility plane 22 to assert some level of influence upon scheduling decisions by requesting changes to the priorities or relative fairness parameters of children within the scheduling plane 24. In one embodiment, the functions of the eligibility plane 22 are performed through a set of eligibility nodes 26, one of which is shown in FIG. 8. Each data queue and each scheduler node has its own eligibility node 26 which contains the static and dynamic state for maintaining the scheduler node's eligibility for scheduling by its parent. A single scheduler 20 may include thousands of eligibility nodes 26. In another embodiment, a single circuit could be the eligibility scheduler 34 for all queues and child nodes in the scheduler 20. In one embodiment, a separate circuit could be used for each eligibility node 26 in the system. In another embodiment a circuit or algorithm could be shared by many or all eligibility nodes 26 by scheduling their access to the circuit or algorithm. This eligibility scheduler is separate from the schedulers of the scheduling plane 22.

Referring to FIG. 8, an exemplary implementation of an eligibility node 26, such as $E_{01}$ in FIG. 4, constructed in accordance with the principles of the current invention includes a queue/node database 28, a rate generator/monitor 30, and an eligibility updater 32. The queue/node database 28 contains the configured and dynamic state data for a queue/node, including queue/node data availability and the current state of rate measurements versus configured rates for the node. Additionally, the node database 28 is active for the nodes and queues involved in transmission. The queue/node database 28 receives updated queue/node data availability and an update to the rate monitoring state of the queue/node, based on the amount of data transmitted.

The rate generator/monitor 30 is responsible for maintaining accurate state describing the comparison between a node's current transmission rate and the configured rates. To perform these functions, the rate generator/monitor 30 maintains accurate time in order to convert between amounts of data transmitted and configured rates. In the current invention, the generator/monitor is responsible for identifying when a node's long term measured rate is below a configured minimum rate, above a configured maximum rate, or in between the minimum and maximum rates. Other implementations are possible, which could represent many more independent states. The rate monitor/generator 30 updates the rate state of the node on each data transmission from a child of the node or a queue associated with the node, and also updates the rate state for a node when the node is not involved in the current transmission event. Also, high accuracy in the rate monitor/generator 30 requires very frequent checking of the node states, so across the eligibility plane 22, the frequency of state transitions can be instantaneously very high. These rate updates lead to eligibility propagation events which are generated independently of the scheduler activity and are both asynchronous and bursty. Unlike the scheduler 20, an exemplary implementation of the rate monitor/generator 30 is not implemented in an O(1) method, but other implementations require O(1) in order to absorb the state transitions into the scheduling plane 24 in real time. It is an important aspect of the present invention that asynchronous and bursty rate-based state changes are supported in the dual plane architecture.

The eligibility updater 32 manages the process of detecting when a change of queue/node state results in a change of eligibility for the queue/node, and of communicating changes of eligibility state to parent scheduling and eligibility nodes. When a queue/node's data availability or rate state changes allowing the queue/node to become eligible, the eligibility updater 32 changes the state of the queue/node to eligible, sends a message to the parent scheduler node via its NEC queue, and informs the parent eligibility node that the parent scheduler node has data available. The eligibility updater also provides more up-to-date eligibility information when the queue/node is being absorbed into the parent scheduling node from the NEC list. In an exemplary implementation, the communication between an eligibility node 26 and its parent may be a simple message including the queue/node's identifier, i.e., which child of the parent is sending the message, and the current eligibility state of the queue/node. The eligibility updater 32 also reevaluates queue/node eligibility when the queue/node is selected for transmission as part of a scheduling decision, based on updated data availability from the queue/node and on updated rate state considering the amount of data transmitted, and informs the parent scheduler of the resulting eligibility state.

Figure 9:
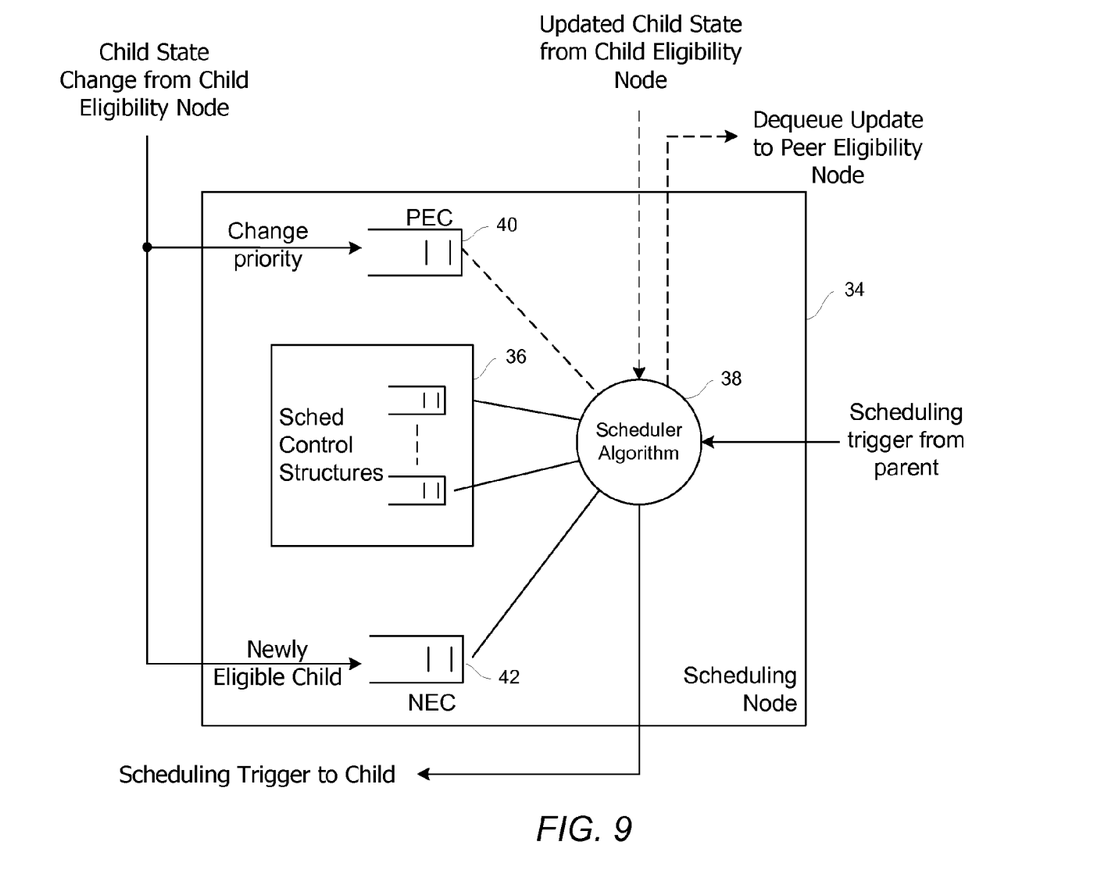
FIG. 9 is a block diagram of an exemplary scheduler node constructed in accordance with the principles of the present invention.

Referring now to FIG. 9, an exemplary implementation of a scheduler node 34, such as $S_{21}$ in FIG. 4, constructed in accordance with the principles of the current invention contains a set of scheduler control data structures 36, a scheduler process 38, PEC list 40 and NEC list 42.

The scheduler control data structures 36 are depicted as containing one or more control queues or lists. In scheduler implementations which must support many children, the scheduler control data structures 36 often include queues or lists employed by the scheduler process 38 in sorting children to achieve fairness and priority separation. The number of scheduler control lists varies by implementation, but having at least two lists allows for separation into a high priority set of children and a low priority set of children. The current invention does not preclude the use of schedulers employing different control data structures, as the current invention applies to any scheduler employing control data structures which require processing to absorb new children.

The NEC 42 and PEC 40 lists are provided for message storage between the children in the eligibility plane 22 and the scheduler node 34. The current invention employs the PEC 40 and NEC 42 to cross between the bursty environment of the eligibility plane 22 and more regular environment of the scheduling plane 24; however, the PEC 40 and NEC 42 are one-to-one associated with scheduling nodes, so for ease of describing the current invention they are drawn as part of the scheduler node 34. One PEC list 40 and one NEC list 42 are depicted in FIG. 9, to demonstrate two different aspects of the current invention: priority elevation and absorbing a newly eligible child in to the scheduler node 34. However, more NEC/PEC lists could be associated with a scheduler node 34 to provide separation based on criteria such as child elevation priority, criticality of the eligibility change, type of eligibility change, or child scheduling priority, class or weight. In this description of the current invention, the NEC 42 and PEC 40 are assumed to be queues, but other forms of message storage structures are within the scope of the current invention.

The scheduler node 34 can be designed to allow the eligibility plane 22 to request changes in priority via the PEC list 40. A scheduler node 34 can be configured to map the priority requests from the eligibility plane 22 to any of its available priorities in the scheduler control structures 36 or to modify a child's scheduling parameters in the scheduler control structures 36. In an exemplary implementation, an expected use for this priority elevation is in allowing the eligibility plane 22 to promote scheduler children who are not achieving necessary transmission rates as measured in the eligibility plane node corresponding to that child.

When the eligibility plane 22 sends a message to the scheduler node 34 indicating that a child has changed state from not eligible to eligible, this message is stored in NEC 42 until it can be absorbed into the scheduler control structures 36. This is a feature allowing the propagation of data available up the scheduling hierarchy without first waiting for absorption of the children by the scheduler nodes at each level, effectively isolating the scheduling plane from the eligibility plane. When a scheduler node 34 is selected by its parent but does not have active children available for scheduling (i.e. known to be eligible children), a child can be selected from the NEC list 42. In this way the NEC list 42 behaves like a best effort priority of service in a priority queuing implementation. In an exemplary embodiment, an absorption event at the scheduler node 34 includes a handshake back to the eligibility node of the child to refresh priority and eligibility information. Other implementations of ensuring up-to-date information are within the scope of this invention, such as allowing the eligibility plane to update priority and eligibility state within the NEC structure 42 as changes occur.

After the scheduler algorithm 38 chooses a child and propagates the selection down the scheduling hierarchy, this scheduler node 34 awaits a response from the selected child's eligibility node (could also be the child scheduler node depending upon the architecture) to indicate the child's new eligibility state. This new eligibility state determines whether the same scheduling decision can be repeated at the next opportunity granted by the parent or if the child should be removed, downgraded or otherwise treated differently in the scheduling control structures 36. In an exemplary implementation, this eligibility update, which immediately follows data transmission, occurs with a combined effort of eligibility nodes providing updated rate conformance information and scheduling nodes and queues providing updated data availability information. If the child is no longer eligible, it is no longer considered active in the scheduler node; and if this the child was the last child in the scheduler control structures 36, and NEC list 42 is empty, then the scheduler informs its eligibility node that data is no longer available and the eligibility node informs the parent scheduler that this scheduler node 34 is no longer eligible for scheduling.

In FIG. 9 the NEC 42 and PEC 40 lists are shown as separate from the scheduler control queues 36 for clarity, but alternate implementations are possible where a scheduler control queue 36 also provides NEC/PEC queuing.

Figure 10:
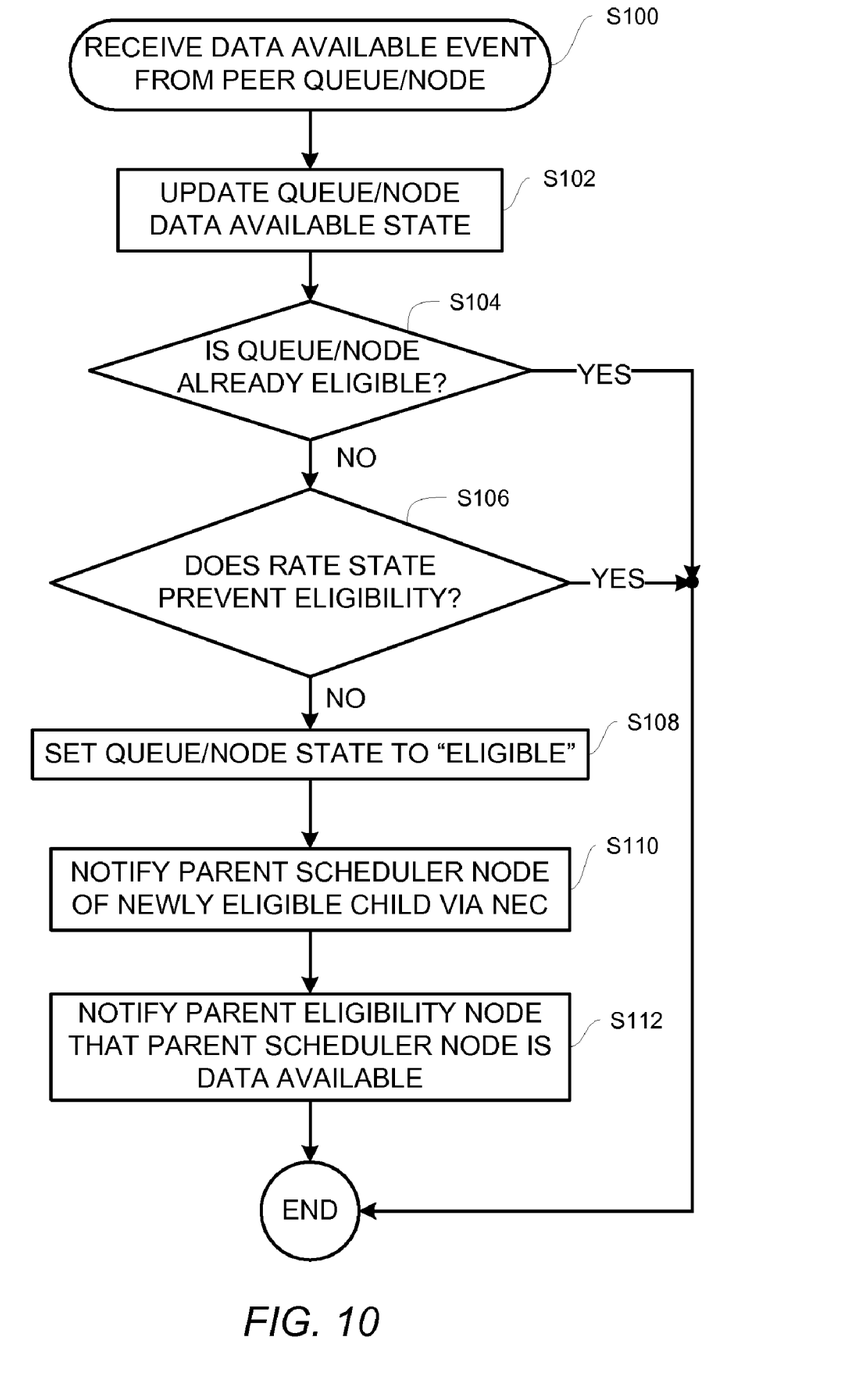
FIGS. 10 and 11 are flowcharts of exemplary eligibility updating processes according to the principles of the present invention.
Figure 11:
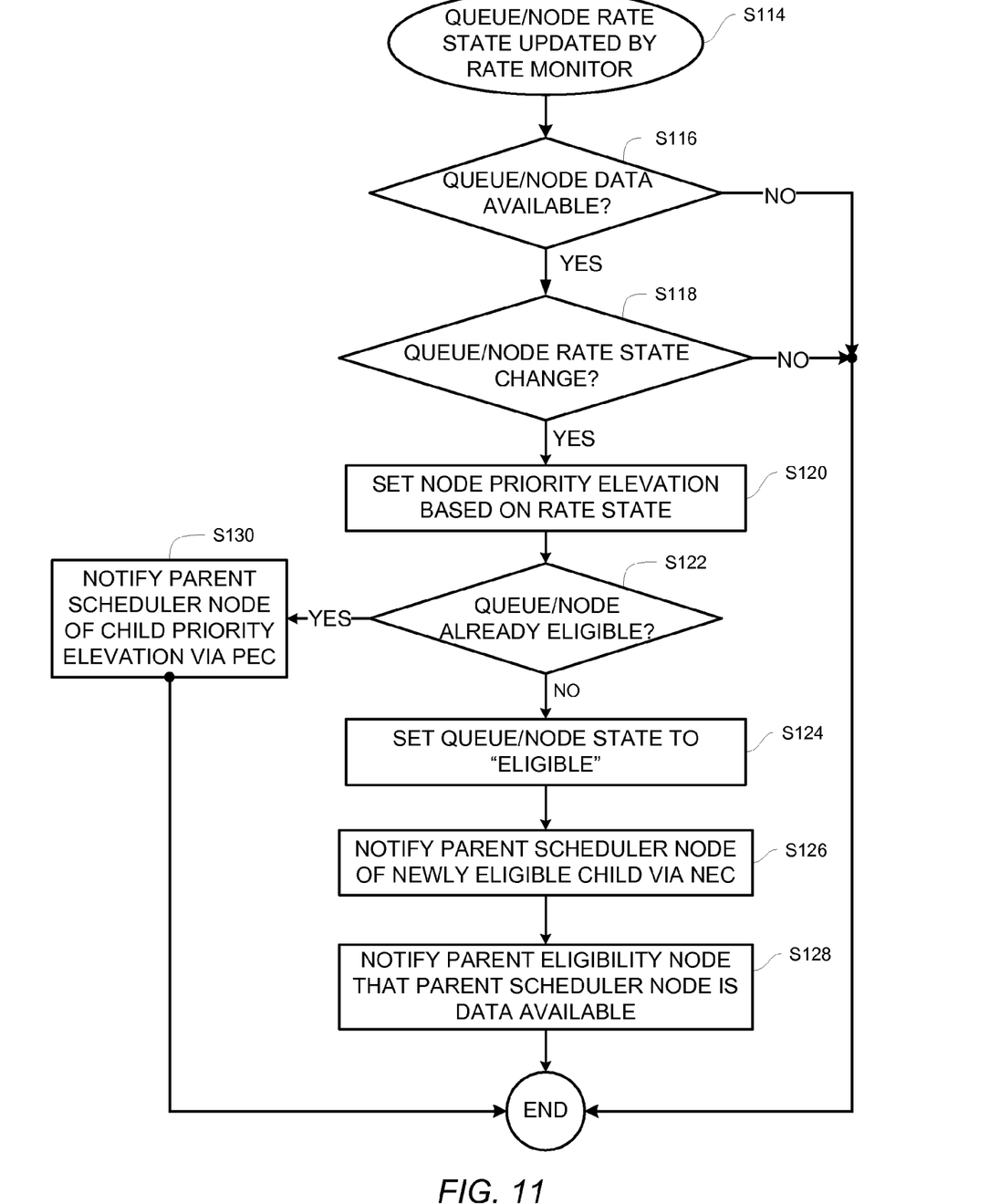
Figure 13:
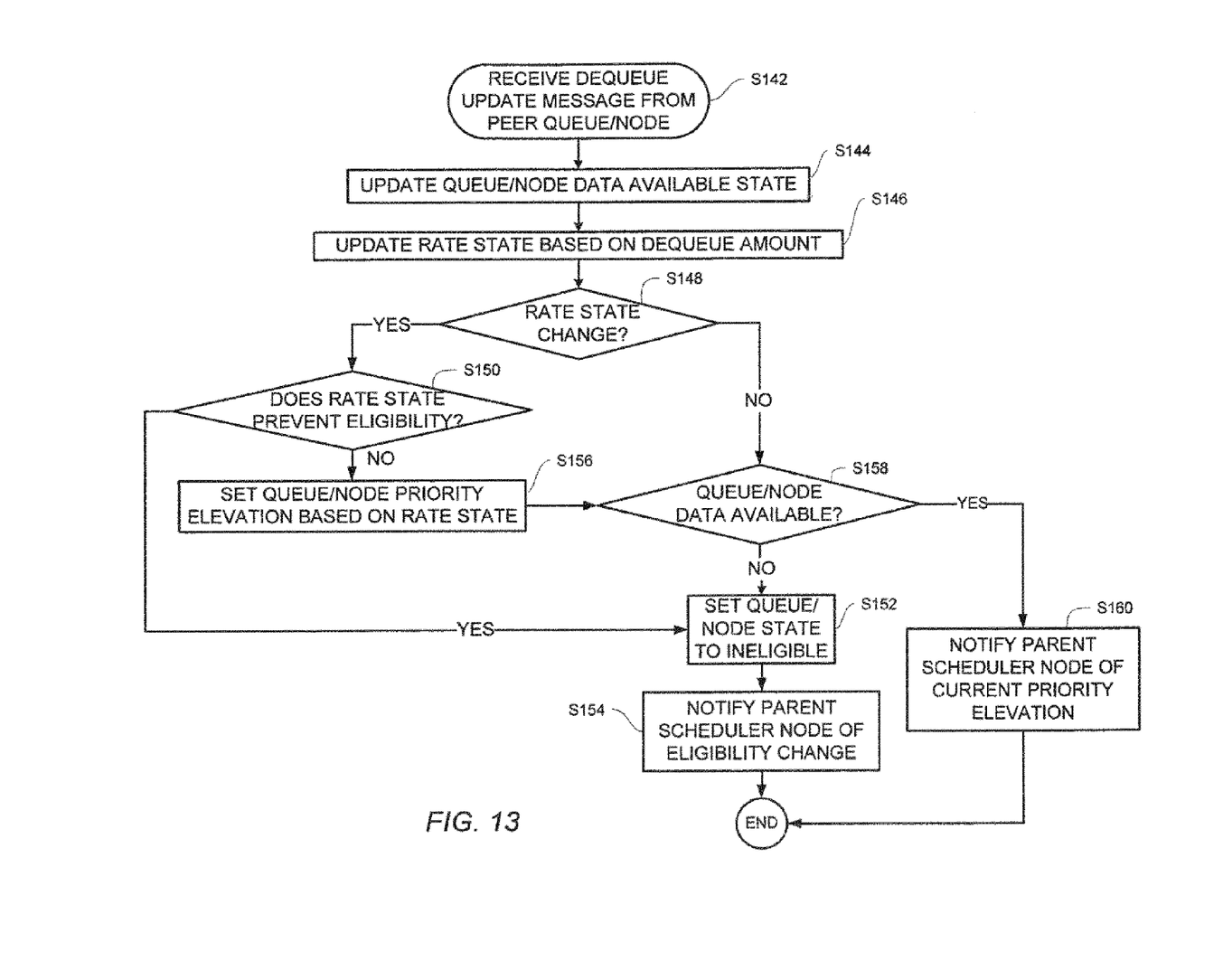
FIG. 13 is a flowchart of an exemplary eligibility updating process according to the principles of the present invention.

An eligibility node 26 determines whether its peer data queue or scheduling node 34 is eligible for scheduling in its parent scheduler. FIGS. 10 and 11 represent two different triggers for the eligibility node 26 updates occurring. Referring to FIG. 10, an exemplary operational flowchart is provided that describes steps performed by an eligibility node 26 for determining whether its peer queue/node is eligible for scheduling by scheduler node 34. The process detailed in FIG. 10 occurs whenever an eligibility node receives a data available event, indicating that its peer data queue or child node has data available for scheduling (step S100). This is the process followed by the eligibility nodes in FIG. 5. The queue/node database 28 is updated with the new data availability information (step S102). If the eligibility node 34 determines (step S104) that the data queue or child node is already eligible, there is nothing to do in response to this event. In this case, the next meaningful event will either be a scheduling plane 24 event as shown in FIG. 13 or a rate process event (priority elevation) as shown in FIG. 11; both are discussed in further detail below.

However, if the data queue and/or scheduler node is in an ineligible state when the data available event arrives at the eligibility node 26, the eligibility updater 32 examines the state of the queue/node database 28 to determine (step S106) whether the current rate measurement state allows the queue/node to become eligible. For instance, if the queue/node currently exceeds its configured maximum rate limit and or burst tolerance, it remains ineligible to transmit. If the rate measurement state permits, the queue/node is made eligible (step S108) and its eligibility is propagated to the parent scheduler node via the NEC 42 (step S110). In this case the parent eligibility node is also notified that the parent scheduler node has data available for scheduling (step S112). A child to parent mapping function is implied in steps S110 and S112.

A previously ineligible queue/node may become eligible again when it begins to operate within its set parameters as detected by the rate generation and monitoring block 30. As depicted in the exemplary flowchart provided in FIG. 11, the eligibility node 26 also reevaluates the eligibility of its peer queue/node starting when the rate monitor 30 has recomputed the rate conformance state and has stored the current rate state in the queue/node database 28 (step S114). This is the process followed by eligibility node $E_{21}$ in FIG. 7. The queue/node may require a change of eligibility state due to observing a slower scheduled rate than previously existed (transitions to higher monitored rates occur as a result of a scheduler trigger). The first test is whether the queue/node has data available to send (step S116). If there is not data to send, then the queue/node will not be eligible. The next test is whether the queue/node has indeed encountered a meaningful rate state change (step S118). If there is no rate state change, then there will be no change in eligibility due to this trigger. If there is data available and rates are lower than limits, then this queue/node is eligible. If the queue/node is not receiving enough bandwidth, then its priority elevation may be changed (increased) to force more bandwidth from the scheduler plane 24 (step S120). If the queue/node was already eligible before this rate update (step S122), then only the priority elevation change is communicated to the parent scheduler node 34 via the PEC 40 (step S130). Otherwise, the queue/node state is changed to eligible (step S124), the queue/node is added to the parent scheduler node's NEC 42 (step S126), and the parent eligibility node is notified that the parent scheduler node has data available for scheduling (step S128).

Figure 12:
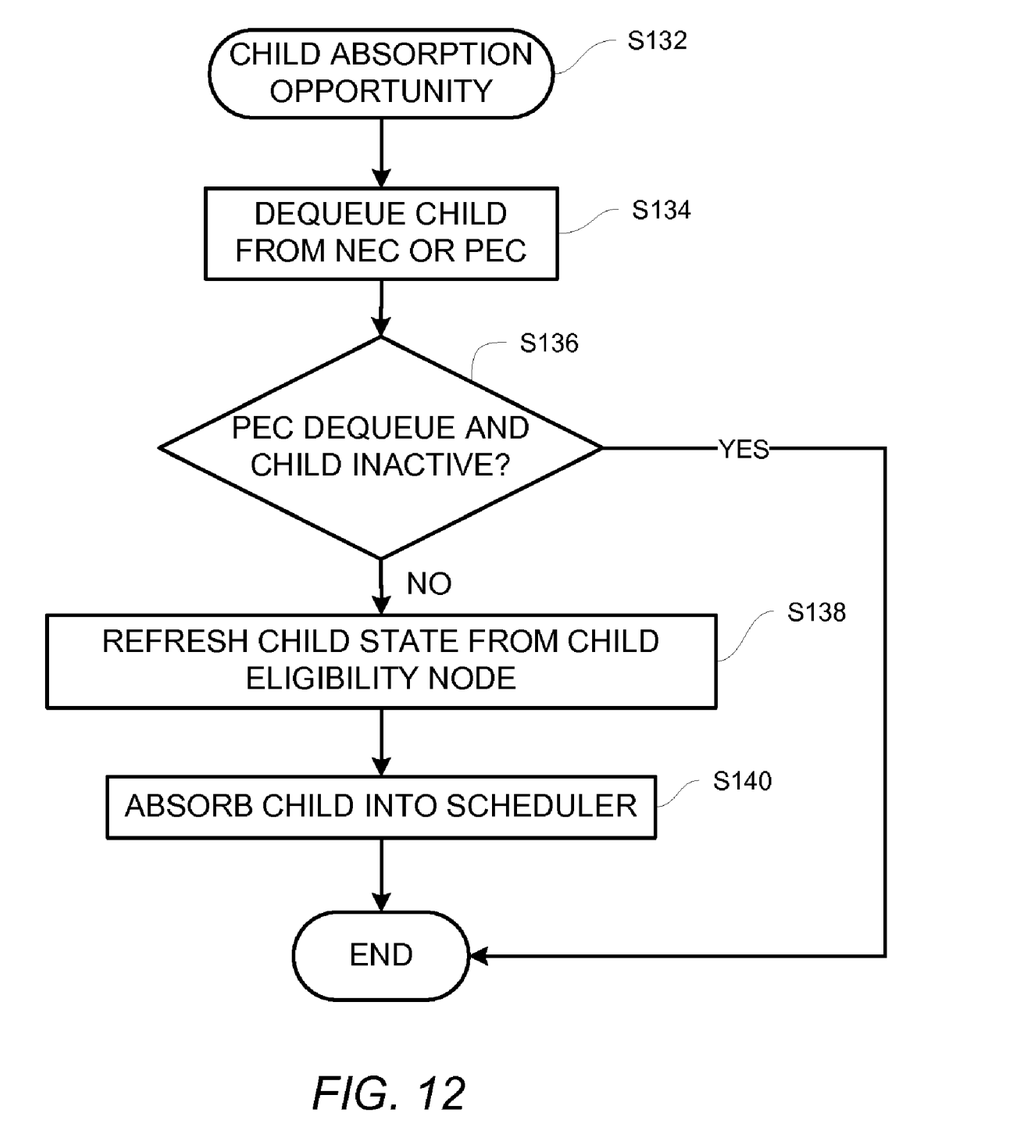
FIG. 12 is a flowchart of an exemplary scheduler process according to the principles of the present invention.

Referring to FIG. 12, an exemplary operational flowchart are is provided that describes steps performed by a scheduler node 34 to absorb a newly eligible child from NEC 42 or a child priority elevation change from PEC 40. These notifications are generated by a child eligibility node 26 and sent to its parent scheduler node 34 NEC/PEC as a result of the processes of FIGS. 10 and 11, as described above and shown in FIGS. 5 and 7. NEC list 42 contains children that have become eligible for selection and are awaiting absorption into the scheduler control lists. PEC list 40 contains children requesting a priority change and awaiting absorption into the scheduler state. In an exemplary embodiment of the current invention, the absorption of NEC/PEC children into the scheduler plane 22 is achieved with a combination of a background absorption task unrelated to the scheduler actions and absorption events for the nodes currently involved in data scheduling. In FIG. 12, when an opportunity occurs to absorb a child into its parent scheduler node context (step S132), a child is dequeued from either an NEC 42 or a PEC 40 list (step S134). The dequeue of children from the NEC 42 or PEC 40 list should be implemented such that the state of the child is up-to-date at the time of absorption.

In one exemplary implementation, the NEC 42 and PEC 40 are simple queues which may contain stale state because the state of the child may have changed subsequent to its enqueue to the NEC/PEC. Note that a newly eligible child shall not become ineligible while enqueued in the NEC 42; only other state such as priority elevation may change. However, a child from PEC list 40 may no longer be eligible or active as a result of scheduler decisions that occurred while the child was queued in the PEC list 40, or other state such as its priority elevation may have changed. In this exemplary implementation, the scheduler node 34 requests and receives this refreshed state from the child eligibility node 26 (step S138). The NEC child or an active PEC child (step S136) is absorbed into the scheduler state by being enqueued into the scheduler control structures 36 (step S140).

In this exemplary implementation, there are restrictions to the use of the NEC/PEC lists as follows: Absorption from an NEC 42 causes the child to become active in the scheduler node control context, based on its refreshed state (priority elevation). Absorption from a PEC 40 may cause the child to be given a higher service priority in the scheduler context based on its refreshed state, but may never cause the child to become active. Therefore, when servicing a PEC 40, only children that are currently active in the scheduler node may have their state refreshed and be absorbed (step S136), other children messages being discarded. Other implementations of the PEC/NEC structures could allow for real-time maintenance of the validity of child entries and accuracy of child state such that a refresh of the state or an inspection of the state of the child is not required at the time of absorption. These alternate implementations of the PEC/NEC structures are within the scope of the present invention. The method of determining which one of an NEC 42 and a PEC 40 should be serviced when a scheduler node has an absorption opportunity is beyond the scope of the present invention.

The hierarchical scheduler 24 selects data for transmission from eligible data queues according to the known hierarchy, the active children in the scheduler control structures 36, and the NEC list 42. During this scheduling process, the hierarchical scheduler 24 exchanges information with the eligibility nodes 26 corresponding to the scheduler nodes 34 involved in the selection.

Referring to FIG. 13, an exemplary operational flowchart is provided that describes steps performed by an eligibility node 26 during the process of selecting data for transmission. This is the process followed by the eligibility nodes in FIG. 6. The hierarchical scheduler 24 selects a path through the scheduling hierarchy corresponding to one or more scheduler nodes and queues which represents data for transmission. To prepare for the next scheduling decision by the hierarchical scheduler 24, which may or may not follow some of the same hierarchy as the current decision, all scheduling nodes involved in the queue selection should update their eligibility state. Unlike the standard propagation of eligibility, this eligibility determination should occur quickly (deterministically bounded) through all the eligibility levels as a fundamental limit to how quickly a single queue can send data back-to-back. The starting point for FIG. 13 is when an eligibility node on the current decision path is informed by its peer scheduler node or data queue of both the amount of data transmitted and whether the scheduler node or data queue will remain data available to transmit for the next scheduler decision (step S142). The eligibility node 26 updates the queue/node data available state (step S144). The rate monitoring block 30 computes the new rate state for the queue/node, considering the amount of data transmitted (step S146). If a rate state change is detected (step S148), then the eligibility updater 32 determines whether its queue/node remains eligible (step S150). For example, if a maximum rate or burst tolerance has been exceeded, then the eligibility updater 32 removes the queue/node from eligibility (step S152), informs the parent scheduler node of the decision (step S154) and waits for the process defined in FIG. 11 to return the queue/node to eligibility. If the rate state change does not prevent the queue/node from remaining eligible (step S150), its priority elevation is changed (step S156). For example, if as a result of the transmission the queue/node's measured rate meets or exceeds some configured minimum rate, the eligibility node 26 may request that the parent scheduler node 34 service the queue/node with a reduced priority.

If there is no rate state change detected at step S148, or only the queue/node's priority elevation changed and there is more data available (step S158), the queue/node remains eligible to transmit and the parent scheduler is informed of the queue/node's priority elevation (step S160). If there is no data available from its peer scheduler node or data queue, the eligibility node 26 updates the status of the queue/node to ineligible (step S152), informs the parent scheduler node of the change (step S154) and waits for the process in FIG. 10 to return the child to eligibility.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for scheduling data dequeuing in a data communication network having a plurality of data queues and a hierarchical scheduler with a plurality of scheduler nodes, the method comprising:
   determining which scheduler nodes and which data queues are eligible for dequeuing scheduling within the hierarchical scheduler based upon at least one predetermined data rate limitation and availability of data at an eligible descendant node; and
   scheduling data for transmission from one of the plurality of eligible data queues within the hierarchical scheduler, scheduling data for transmission including selecting one or more scheduler nodes which are ancestors of the one data queue but to which an eligible child scheduler node is not known to be eligible.

2. The method of claim 1, wherein the eligible child scheduler node which is not known to be eligible to the selected one or more scheduler nodes is in a Newly Eligible Child (NEC) list.

3. The method of claim 1, where determining which scheduler nodes and which data queues are eligible for dequeuing scheduling includes:
   receiving an indication that one of the child scheduler nodes and the data queue contains data available for scheduling;
   receiving current data rate information for the one of the child scheduler nodes and data queue;
   comparing the current data rate information for one of the child scheduler nodes and data queue to predetermined data rate limitations; and
   determining that one of the child scheduler node and data queue has both data available and is within the predetermined data rate limitations.

4. The method of claim 3, further comprising:
   determining that data is available for a queue as an existence of data ready for selection in the queue; and
   determining that data is available for a scheduler node as an existence of any eligible child node.

5. The method of claim 1, wherein the predetermined data rate limitations are set individually for each data queue of the plurality of data queues and each scheduler node of the plurality of scheduler nodes.

6. The method of claim 1, wherein the at least one predetermined data rate limitation include at least one of a maximum data rate, a minimum data rate, and a burst tolerance.

7. A system for scheduling data in a data communication network, the system comprising:
   a hierarchical scheduling plane, the hierarchical scheduling plane having a plurality of scheduler nodes arranged in a tree structure, the scheduling plane scheduling an eligible data queue for dequeuing within the hierarchical scheduling plane, and selecting data for transmission from one of a plurality of data queues;
   a rate generator/monitor, the rate generator/monitor associating a state to at least one of the scheduler nodes and queues in the scheduler tree structure; and
   a message storage structure in communication with the rate generator/monitor and a scheduler node for at least one parent node, the message storage structure storing messages requesting that one of a child scheduler node and a child queue state become active in the scheduler node.

8. The system of claim 7, wherein the messages indicate one or more of child scheduler nodes and child queues which are eligible for selection and which are not known to be eligible by the scheduler node.

9. The system of claim 8, further comprising:
   an eligibility plane, the eligibility plane determining whether each data queue and each scheduler node in the scheduling plane is eligible for selection,
   wherein one of a child scheduler node and a child queue is eligible for selection when the one of a child scheduler node and a child queue has data available and the rate generator/monitor determines that the transmission rate is within a predetermined limit.

10. The system of claim 9, wherein a scheduler node is determined as having data available when any child of the corresponding scheduler node is eligible for selection.

11. The system of claim 9, wherein changes of eligibility state are propagated up through the scheduling hierarchy from one of a child scheduler node and a data queue to a parent scheduler node.

12. The system of claim 8, wherein the hierarchical scheduling plane selects scheduler nodes for transmission which have eligible children, and
   wherein the selected scheduler node may determine that the selected scheduler node has no child known to be eligible and selects one of a child scheduler node and a child queue from the message storage structure.

13. The system of claim 7, wherein the messages indicate one or more of child scheduler nodes and child queues which are known to be eligible by the scheduler node but require higher priority in the scheduler node; and
   wherein the scheduler node, upon being selected for scheduling, processes one or more messages by adjusting the data corresponding to the one or more children to provide a higher priority for the one or more children; and
   wherein adjusting the data for each of the one or more child scheduler nodes and child queues includes one or more of:
      moving one of the child scheduler nodes and the child queue from a weighted scheduling structure to a priority scheduling structure;
      moving one of the child scheduler nodes and the child queue from a lower priority structure to a higher priority structure; and
      altering a weight of one of the child scheduler nodes and the child queue in the scheduling state.

14. The system of claim 13, further including a scheduler node context memory, the scheduler node context memory supporting at least one of priority scheduling, weight based scheduling and separating higher priority child scheduler nodes and child queues from lower priority child scheduler nodes and child queues, wherein the relative priority between the child scheduler nodes and the child queues requiring higher priority and child scheduling nodes and child queues at a default priority are configurable with priorities including:
   lower priority children normal state;
   lower priority children priority elevated state;
   higher priority children normal state; and
   higher priority children priority elevated state.

15. A scheduler for scheduling data dequeuing in a data communication network, the scheduler comprising:
   an eligibility plane, the eligibility plane determining that a data queue of a plurality of data queues is eligible for dequeuing scheduling within the scheduler based upon at least one predetermined data rate limitation and presence of data in the data queue; and
   a scheduling plane communicatively coupled to the eligibility plane, the scheduling plane scheduling the eligible data queue for dequeuing within the scheduler, the scheduling plane being arranged as a tree structure, the scheduling plane having at least one scheduler node determining a relative fairness between children, each data queue of the plurality of data queues stemming from at least one of the scheduler nodes.

16. The scheduler of claim 15, wherein the eligibility plane includes an eligibility node for each data queue in the plurality of data queues and each node of the scheduling tree, and wherein the eligibility node combines an aggregate rate limitation for the corresponding one of a scheduler node and a data queue with eligibility of any one of a child scheduling node and a child data queue for the scheduler node to determine that a descendant queue is eligible.

17. The scheduler of claim 15, wherein the scheduling plane further:
- schedules one of a scheduler node and a data queue for distribution; and
- dequeues data from the eligible descendant.

18. The scheduler of claim 15, wherein the eligibility plane further determines that one of a child scheduler node and a child data queue is ineligible for distribution as a result of one of a previously eligible descendant becoming ineligible and a rate limit for the one of the child scheduler node and the child data queue being exceeded.

19. The scheduler of claim 15, wherein the eligibility plane further:
- receives an indication that a data queue contains data available for scheduling;
- receives current data transmission rate information for the data queue;
- compares the current data rate information to predetermined data rate limitations to determine data queue eligibility; and
- notifies the scheduling plane of the eligible data queue.

20. The scheduler of claim 19, wherein the eligibility plane further:
- receives information from the scheduling plane identifying an existence of a parent-child pair of nodes where the child is one of an eligible data queue and an eligible child scheduler node of the parent;
- determines the parent node is data available for scheduling based on the existence of the eligible child; and
- receives current data transmission rate information for the parent;
- compares the current data transmission rate information to the predetermined data transmission rate limitations to determine parent eligibility; and
- notifies the scheduling plane that the parent node is eligible for scheduling.

* * * * *

UNITED STATES PATENT AND TRADEMARK OFFICE
CERTIFICATE OF CORRECTION

| | | |
|---|---|---|
| PATENT NO. | : 7,969,884 B1 | Page 1 of 1 |
| APPLICATION NO. | : 12/118410 | |
| DATED | : June 28, 2011 | |
| INVENTOR(S) | : Bradley D. Venables and David G. Stuart | |

It is certified that error appears in the above-identified patent and that said Letters Patent is hereby corrected as shown below:

IN THE CLAIMS:

In Column 16, line 39, Claim 14, replace "scheduling" with --scheduler--.

In Column 16, line 65, Claim 16, replace "scheduling" with --scheduler--.

Signed and Sealed this
Sixth Day of September, 2011

David J. Kappos
*Director of the United States Patent and Trademark Office*